United States Patent
Hung et al.

(10) Patent No.: US 9,608,476 B2
(45) Date of Patent: Mar. 28, 2017

(54) CHARGING SYSTEM AND CHARGING METHOD THEREOF

(71) Applicant: ASUSTeK COMPUTER INC., Taipei (TW)

(72) Inventors: Yu Hung, Taipei (TW); Tzu-Nan Cheng, Taipei (TW); Yu-Cheng Shen, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 155 days.

(21) Appl. No.: 14/602,999

(22) Filed: Jan. 22, 2015

(65) Prior Publication Data

US 2015/0214762 A1    Jul. 30, 2015

(30) Foreign Application Priority Data

Jan. 24, 2014  (CN) .......................... 2014 1 0035859

(51) Int. Cl.
*H02J 7/00* (2006.01)
*H02J 7/04* (2006.01)
*H02J 5/00* (2016.01)

(52) U.S. Cl.
CPC .............. *H02J 7/041* (2013.01); *H02J 5/005* (2013.01); *Y02B 40/90* (2013.01)

(58) Field of Classification Search
CPC .......... H02J 7/025; H02J 5/005; H02J 7/0011; H02J 17/00; H02J 7/0052; H02J 2007/0096; H02J 7/00; H02J 2007/0001; H02J 7/045; H02J 2007/0098; H02J 7/0004; H02J 7/0031; H02J 7/0044; H02J 7/0091; H02J 50/10; H02J 50/60

USPC ................................................. 320/107–115
See application file for complete search history.

(56) References Cited

U.S. PATENT DOCUMENTS

| 2007/0091925 | A1* | 4/2007 | Miyazaki | H04B 3/542 370/469 |
| 2009/0021219 | A1* | 1/2009 | Yoda | H02J 7/0011 320/137 |
| 2009/0174364 | A1* | 7/2009 | Onishi | H02J 7/025 320/108 |
| 2011/0208980 | A1 | 8/2011 | Brooks et al. | |
| 2012/0299566 | A1 | 11/2012 | Hsu | |

FOREIGN PATENT DOCUMENTS

| CN | 102801320 A | 11/2012 |
| CN | 102822812 A | 12/2012 |
| CN | 202798064 | 3/2013 |
| TW | 201019086 | 5/2010 |

* cited by examiner

*Primary Examiner* — Binh Tat
(74) *Attorney, Agent, or Firm* — Muncy, Geissler, Olds & Lowe, P.C.

(57) ABSTRACT

A charging system includes a transmission line, a power adaptor, and an electronic device. The transmission line includes a first terminal and a second terminal. The power adaptor is coupled to the first terminal and generates a charging voltage and a first voltage signal. The charging voltage is at a first voltage level. The electronic device is coupled to the second terminal and receives the first voltage signal. When the first voltage signal is larger than a first preset voltage signal, the electronic device outputs a second voltage signal to the power adaptor. When the second voltage signal is larger than a second preset voltage signal, the power adaptor adjusts the charging voltage into a second voltage level.

11 Claims, 7 Drawing Sheets

CHARGING SYSTEM AND CHARGING METHOD THEREOF

CROSS-REFERENCE TO RELATED APPLICATION

This application claims the priority benefit of CN application serial No. 201410035859.6, filed on Jan. 24, 2014. The entirety of the above-mentioned patent application is hereby incorporated by reference herein and made a part of specification.

BACKGROUND OF THE INVENTION

Field of the Invention

The disclosure relates to a charging system and a charging method thereof.

Description of the Related Art

A universal serial bus (USB) is a popular transmission interface which provides a charging and transmission data function in person's life. However, the charging function of a conventional USB is limited by a standard charging voltage 5V, and a USB can provide 10 W power at most. Although a USB can meet the charging requirement of most portable electronic devices, such as a mobile phone or a camera, it usually takes a long time for charging, and cannot meet the requirements of high-power products, such as a display or a notebook computer.

BRIEF SUMMARY OF THE INVENTION

A charging system includes a transmission line, a power adaptor and an electronic device. The transmission line includes a first terminal and a second terminal. The power adaptor is coupled to the first terminal and generates a charging voltage and a first voltage signal, and the charging voltage is at a first voltage level. The electronic device is coupled to the second terminal and receives the first voltage signal. When the first voltage signal is larger than a first preset voltage signal, the electronic device outputs a second voltage signal to the power adaptor. When the second voltage signal is larger than a second preset voltage signal, the power adaptor adjusts the charging voltage to a second voltage level.

A charging method is applied to a charging system. The charging system includes a transmission line, a power adaptor and an electronic device. The transmission line is coupled to the power adaptor and the electronic device, respectively. The power adaptor generates a charging voltage, and the charging voltage is at a first voltage level. The charging method includes following steps: the electronic device receiving a first voltage signal generated by the power adaptor; outputting a second voltage signal to the power adaptor by the electronic device when the first voltage signal is larger than a first preset voltage signal; and adjusting the charging voltage to a second voltage level by the power adaptor when the second voltage signal is larger than a second preset voltage signal.

In sum, in the charging system and the charging method thereof, the voltage level of the charging voltage is adjusted based on whether the first voltage signal is larger than the first preset voltage signal, and whether the second voltage signal is larger than the second preset voltage signal. Thus, power management and applying are safer, the charging efficiency can be improved, and the transmission line can also be applied to common electronic products or devices.

These and other features, aspects and advantages of the present disclosure will become better understood with regard to the following description, appended claims, and accompanying drawings.

DETAILED DESCRIPTION OF THE EMBODIMENTS

A charging system and a charging method thereof are illustrated with relating figures, and the same symbols denote the same components.

Figure 1:
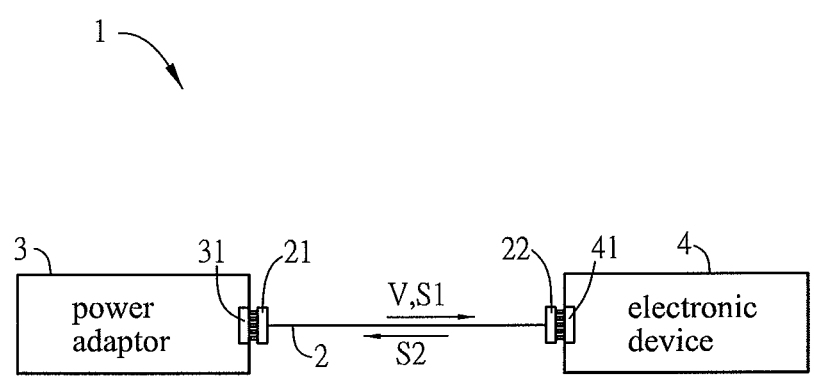
FIG. 1 is a schematic diagram showing a charging system in an embodiment.

FIG. 1 is a schematic diagram showing a charging system in an embodiment. Please refer to FIG. 1, the charging system 1 includes a transmission line 2, a power adaptor 3 and an electronic device 4.

Figure 2A:
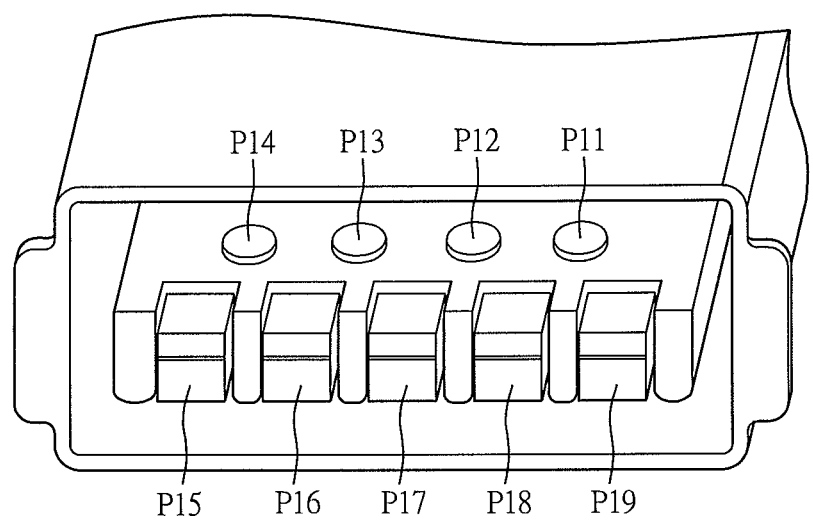
FIG. 2A is a schematic diagram showing pins of a first terminal in an embodiment.
Figure 2B:
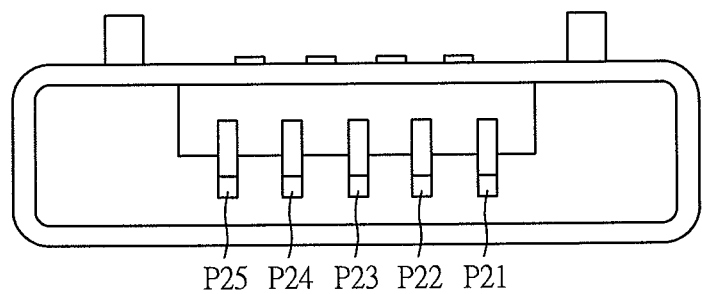
FIG. 2B and FIG. 2C are schematic diagrams showing pins of a second terminal in an embodiment.
Figure 2C:
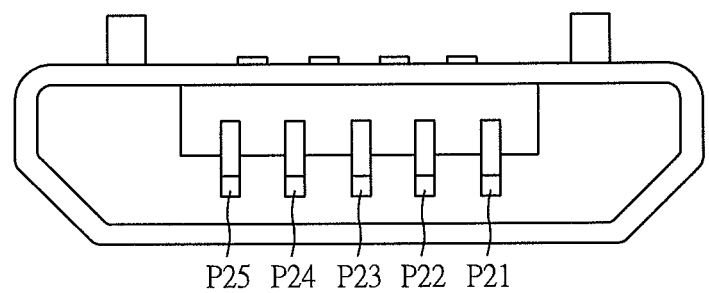

The transmission line 2 includes a first terminal 21 and a second terminal 22. The first terminal 21 is coupled to the power adaptor 3, and the second terminal 22 is coupled to the electronic device 4. In the embodiment, the first terminal 21 is a USB 3.0 terminal, and definitions of pins can be referred to FIG. 2A and TABLE 1. The second terminal 22 is a Micro-USB 2.0 terminal, and definitions of pins can be referred to FIG. 2B (Micro-USB 2.0 A type), FIG. 2C (Micro-USB 2.0 B type) and TABLE 2.

Since a part of the pins are used to transmit signals with specific functions, the seventh pin (pin No. P17, GND_DRAIN) of the first terminal 21 is connected to the fourth pin (pin No. P24, ID) of the second terminal 22 to avoid the affecting on signal transmission. The selection of pins is not limited herein, as long as the power adaptor 3 can communicate with the electronic device 4.

TABLE 1

| pin number | signal name (A interface) | signal name (B interface) |
|---|---|---|
| P11 | | VBUS |
| P12 | | D− |
| P13 | | D+ |
| P14 | | GND |
| P15 | StdA_SSRX− | StdA_SSRX+ |
| P16 | StdA_SSRX+ | StdA_SSRX− |
| P17 | | GND_DRAIN |
| P18 | StdA_SSTX− | StdA_SSTX+ |
| P19 | StdA_SSRX+ | StdA_SSTX− |

TABLE 2

| pin number | signal name |
|---|---|
| P21 | VBUS |
| P22 | D− |
| P23 | D+ |
| P24 | ID |
| P25 | GND |

The power adaptor 3 includes a first connecting portion 31 which is a USB 3.0 interface and is coupled to the first terminal 21 of the transmission line 2. The electronic device 4 includes a second connecting portion 41 which is a micro-USB 2.0 interface and is coupled to the second terminal 22 of the transmission line 2. The power adaptor 3 generates a charging voltage V and a first voltage signal S1. When the power adaptor 3 is coupled to the electronic device 4 via the transmission line 2, the power adaptor 3 outputs the charging voltage V and the first voltage signal S1 and then transmits the charging voltage V and the first voltage signal S1 to the electronic device 4 via the transmission line 2.

In the embodiment, the charging voltage V is transmitted from the first pin P11 of the first terminal 21 of the transmission line 2 to the first pin P21 of the second terminal 22 to charge the electronic device 4. At the moment, the charging voltage V is at a first voltage level V1. The first voltage signal S1 is transmitted from the seventh pin P17 of the first terminal 21 of the transmission line 2 to the fourth pin P24 of the second terminal 22 to be provided to the electronic device 4. When the electronic device 4 receives the first voltage signal S1, whether the first voltage signal S1 is larger than a first preset voltage signal PS1 is determined. When the first voltage signal S1 is larger than the first preset voltage signal PS1, the electronic device 4 outputs a second voltage signal S2 to the power adaptor 3. In the embodiment, the second voltage signal S2 is transmitted from the fourth pin P24 of the second terminal 22 of the transmission line 2 to the seventh pin P17 of the first terminal 21 to be outputted to the power adaptor 3.

When the power adaptor 3 receives the second voltage signal S2 from the electronic device 4, whether the second voltage signal S2 is larger than a second preset voltage signal PS2 is determined. When the second voltage signal S2 is larger than the second preset voltage signal PS2, the power adaptor 3 adjusts the charging voltage V from the first voltage level V1 to a second voltage level V2. In the embodiment, the second voltage level V2 is larger than the first voltage level V1. Moreover, when the second voltage signal S2 is not larger than the second preset voltage signal PS2, the power adaptor 3 maintains the charging voltage V at the first voltage level V1.

As a result, the power adaptor 3 can determine whether the electronic device 4 includes a quick charging function to adjust the voltage level of the charging voltage V accordingly or adjusts the voltage level of the charging voltage V according to different requirements for the charging voltage V of the electronic device 4. In the embodiment, the charging voltage V can be adjusted to be at two different voltage levels. In other embodiments, the power conversion unit can provide multiple charging voltages V at different voltage levels according to product requirements and the circuit layout, which is not limited herein.

Figure 3:
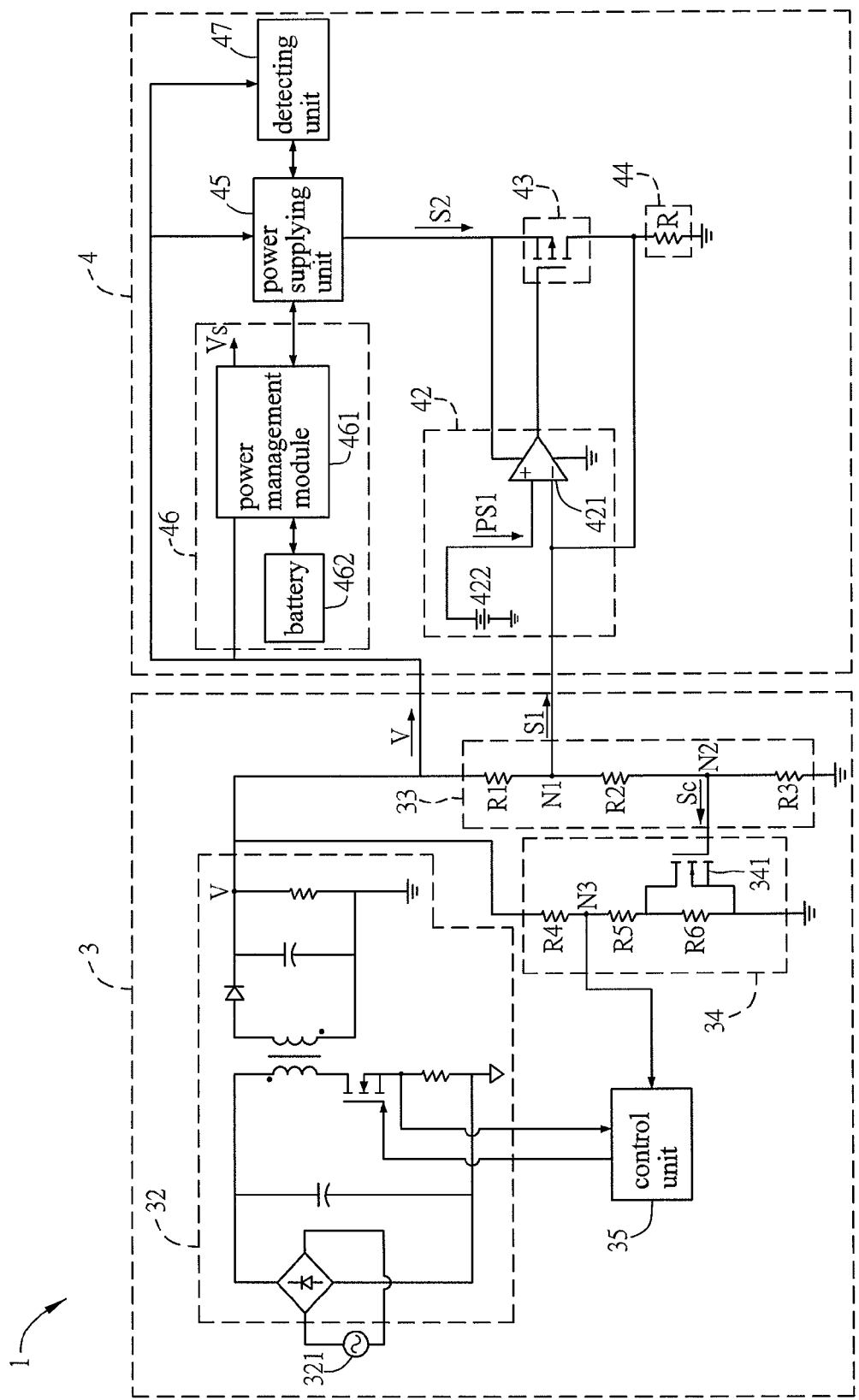
FIG. 3 is a schematic diagram showing a circuit of a charging system in an embodiment.

FIG. 3 is a schematic diagram showing a circuit of the charging system 1 in an embodiment. The power adaptor 3 includes a power conversion unit 32, a voltage division unit 33, a determining unit 34 and a control unit 35.

The power conversion unit 32 is coupled to the first terminal 21 and generates the charging voltage V. In the embodiment, the power conversion unit 32 is coupled to a power supply 321, such as a mains supply, and generates the charging voltage V for charging the electronic device 4. The voltage level of the charging voltage V is preset to the first voltage level V1. The power conversion unit 32 may be a flyback circuit or a buck circuit, which is not limited herein.

The voltage division unit 33 is coupled to the power conversion unit 32 and generates the first voltage signal S1 according to the charging voltage V. In the embodiment, the voltage division unit 33 includes a first resistor R1, a second resistor R2 and a third resistor R3. One end of the first resistor R1 is coupled to the power conversion unit 32, two ends of the second resistor R2 are coupled to the other end of the first resistor R1 and one end of the third resistor R3, respectively, and the other end of the third resistor R3 is coupled to the ground. That is, the first resistor R1, the second resistor R2 and the third resistor R3 are connected in series. In the embodiment, the resistance of the first resistor R1 is 220K Ω, the resistance of the second resistor R2 is 270K Ω, and the resistance of the third resistor R3 is 68K Ω.

The determining unit 34 is coupled to the voltage division unit 33. In the embodiment, the determining unit 34 includes a switch element 341, a fourth resistor R4, a fifth resistor R5 and a sixth resistor R6. The fourth resistor R4 is connected to the fifth resistor R5 in series. The switch element 341 is connected to the sixth resistor R6 in parallel, and the switch element 341 and the sixth resistor R6 are coupled to one end of the fifth resistor R5. The switch element 341 may be an N channel metal oxide semiconductor (NMOS), and the gate of the switch element 341 is coupled to a connecting point N2 of the second resistor R2 and the third resistor R3 of the voltage division unit 33. Moreover, the control unit 35 is coupled to the power conversion unit 32 and the determining unit 34. In detail, a connecting point N3 of the fourth resistor R4 and the fifth resistor R5 is coupled to the control unit 35.

Please refer to FIG. 3 and FIG. 1, the electronic device 4 includes a comparing unit 42, a switching unit 43, a stabilizing unit 44 and a power supplying unit 45. The comparing unit 42 is coupled to the second terminal 22 and receives the first voltage signal S1 outputted by the power adaptor 3. In the embodiment, the comparing unit 42 includes a comparator 421 and a preset voltage generating element 422, for example the preset voltage generating element may be a battery. The preset voltage generating element 422 is coupled to the comparator 421 and outputs the first preset voltage signal PS1. In the embodiment, the inverting input node of the comparator 421 receives the first voltage signal S1, and the non-inverting input node receives the first preset voltage signal PS1.

The switching unit 43 is coupled to the comparing unit 42. The power supplying unit 45 is coupled to the switching unit 43 and the comparing unit 42, and outputs the second voltage signal S2. The stabilizing unit 44 is coupled to the comparing unit 42 and the switching unit 43. In the embodiment, the switching unit 43 is a positive channel metal oxide semiconductor (PMOS). The gate of the switching unit 43 is coupled to an output node of the comparator 421, the source is coupled to the power supplying unit 45, and the drain is coupled to the inverting input node of the comparator 421 and the stabilizing unit 44. The stabilizing unit 44 includes a voltage stabilizing resistor R, and the resistance is 2.7M Ω. Additionally, the power supplying unit 45 may be a boost circuit and provides a working voltage to the comparator 421.

Moreover, the electronic device 4 further includes a battery unit 46 and a detecting unit 47. The battery unit 46 is coupled to the power adaptor 3 and receives the charging voltage V. In the embodiment, the battery unit 46 includes a power management module 461 and a battery 462. The power management module 461 is coupled to the power adaptor 3 and the power supplying unit 45, and receives the charging voltage V. The battery 462 is coupled to the power management module 461. In the embodiment, the power management module 461 receives the charging voltage V and charges the battery 462 to provide a system voltage Vs to maintain the operation power for the system and the components of the electronic device 4. Furthermore, the power supplying unit 45 outputs the second voltage signal S2 according to the voltage provided by the power management module 461. The detecting unit 47 is coupled to the power supplying unit 45 and receives the charging voltage V to detect a connecting state between the electronic device 4 and the power adaptor 3. When the detecting unit 47 does not receive the charging voltage V, it means that the power adaptor 3 is not coupled to the electronic device 4, and the electronic device 4 does not need to output the second voltage signal S2 to the power adaptor 3. At the moment, the detecting unit 47 turns off the power supplying unit 45 to save power. When the detecting unit 47 receives the charging voltage V, it means that the power adaptor 3 is coupled to the electronic device 4, and the detecting unit 47 enables the power supplying unit 45. The power supplying unit 45 provides the second voltage signal S2 and a working voltage needed by the comparing unit 42.

Please refer to FIG. 1 to FIG. 3, the charging process of the charging system is further illustrated. The power adaptor 3 is coupled to the power supply 321 and generates the charging voltage V. The charging voltage V is at the first voltage level V1, and the charging voltage V may be a USB standard charging voltage 5V. At the moment, the first voltage level V1 is divided by the voltage division unit 33, and the first voltage signal S1, whose voltage value (or voltage level) is 3V, is generated at the connecting point N1 of the first resistor R1 and the second resistor R2. A control signal Sc is outputted from the connecting point N2 of the second resistor R2 and the third resistor R3 to the switch element 341 of the determining unit 34. The voltage value (or the voltage level) of the control signal Sc is 0.6V.

When the voltage value of the control signal Sc is larger than a threshold voltage value of the switch element 341, the switch element 341 is turned on, and the sixth resistor R6 is short-circuit. Thus, the voltage transmitted from the connecting point N3 to the control unit 35 is changed. Then, the control unit 35 controls the power conversion unit 32 to adjust the voltage level of the charging voltage V from the first voltage level V1 to the second voltage level V2. The second voltage level V2 is 15V.

In the embodiment, the threshold voltage value of the switch element 341 is 2.5V. Thus, when the charging voltage V outputted by the power adaptor 3 is at the first voltage level V1 (5V), since the voltage value of the control signal Sc (0.6V) is smaller than the threshold voltage value of the switch element 341 (2.5V), the charging voltage V outputted by the power adaptor 3 would not be adjusted to the second voltage level V2 (15V).

When the power adaptor 3 is coupled to the electronic device 4 via the transmission line 2, the connecting point N1 is coupled to the seventh pin P17 of the first terminal 21, and the first voltage signal S1 is transmitted to the fourth pin P24 of the second terminal 22 through the transmission line 2. Thus, the first voltage signal S1 is outputted to the electronic device 4.

Then, the comparing unit 42 receives the first voltage signal S1 and determines whether the first voltage signal S1 is larger than the first preset voltage signal PS1. In the embodiment, the comparator 421 of the comparing unit 42 receives the first voltage signal S1, and the first preset voltage signal PS1 outputted by the preset voltage generating element 422 may be 2.5V. When the voltage value (or voltage level) of the first voltage signal S1 is larger than the voltage value (or voltage level) of the first preset voltage signal PS1, the output node of the comparator 421 outputs a low potential, such as 0V, so as to conduct the switching unit 43. At the moment, the second voltage signal S2 is transmitted to the second terminal 22 via the switching unit 4 and then outputted to the power adaptor 3. In the embodiment, the voltage value of the second voltage signal S2 is 15V. Moreover, when the voltage value of the first voltage signal S1 is not larger than that of the first preset voltage signal PS1, the output node of the comparing unit 42 outputs a high potential, such as 15V, so as to cut-off the switching unit 43. In other words, the electronic device 4 would not output the second voltage signal S2.

The second voltage signal S2 outputted by the electronic device 4 is transmitted from the fourth pin P24 of the second terminal 22 to the seventh pin P17 of the first terminal 21, and then the second voltage signal S2 is outputted to the connecting point N1. At the moment, the voltage level at the connecting point N1 is changed from the voltage level of the first voltage signal S1 (3V) to that of the second voltage signal S2 (15V). After the voltage is divided by the second resistor R2 and the third resistor R3 of the voltage division unit 33, the voltage level of the control signal Sc at the connecting point N2 is changed from 0.6V to 3V. Since the voltage value of the control signal Sc (3V) is larger than the threshold voltage value of the switch element 341 (2.5V), the voltage level of the charging voltage V outputted by the power conversion unit 32 is adjusted from the first voltage level V1 to the second voltage level V2.

Furthermore, since the voltage value of the control signal Sc is generated by dividing the second voltage signal S2, when the voltage level at the connecting point N1 is larger than 12.5V, the voltage level of the control signal Sc is larger than the threshold voltage value of the switch element 341 (2.5V). In other words, the second preset voltage signal PS2 is at 12.5V, and when the voltage level of the second voltage signal S2 is larger than that of the second preset voltage signal PS2, the power adaptor 3 adjusts the voltage level of the charging voltage V to the second voltage level V2.

Consequently, the power adaptor 3 can adjust the voltage level of the charging voltage V from the first voltage level V1 to the second voltage level V2 according to the requirement of the electronic device 4.

Furthermore, when the power adaptor 3 is disconnected from the electronic device 4, the voltage level of the connecting point N1 is not the voltage level of the second voltage signal S2 (15V), and the voltage level of the connecting point N1 is a divided voltage of the second voltage level V2. After the voltage is divided by the first resistor R1, the second resistor R2 and the third resistor R3, the voltage level of the connecting point N1 is 9.1V which is smaller than the voltage level of the second preset voltage signal PS2 (12.5V). Thus, the voltage level of the charging voltage V is instantly adjusted to the first voltage level V1.

As stated above, when the power adaptor 3 is disconnected from the electronic device 4, the detecting unit 47 of the electronic device 4 turns off the power supplying unit 45. At the moment, the second voltage signal S2 is not at the fourth pin P24 of the second terminal 22.

Figure 4:
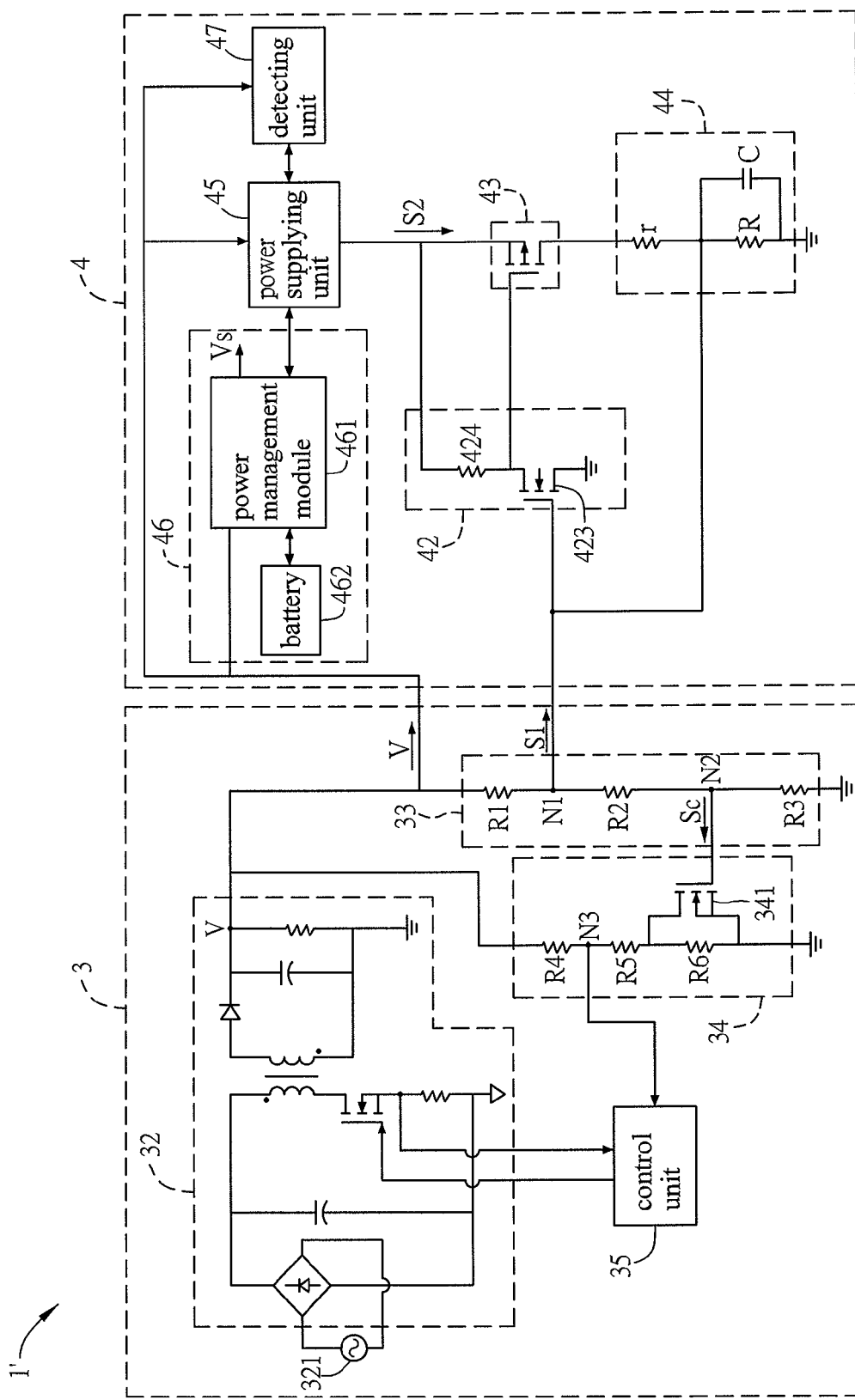
FIG. 4 is a schematic diagram showing a circuit of a charging system in an embodiment.

FIG. 4 is a schematic diagram showing a circuit of a charging system 1' in an embodiment. In the embodiment, the comparing unit 42 of the charging system 1' includes a switch element 423 and an impedance element 424. The switch element 423 of the comparing unit 42 may be an NMOS. The gate of the switch element 423 receives the first voltage signal S1, the drain is coupled to the impedance element 424 and the switching unit 43, and the source is coupled to the ground. The resistance of the impedance element 424 may be 200K Ω. The threshold voltage value of the switch element 423 of the comparing unit 42 may be 2V, which means the voltage level of the first preset voltage signal PS1 is 2V. When the power adaptor 3 is coupled to the electronic device 4 via the transmission line 2, the gate of the switch element 423 of the comparing unit 42 receives the first voltage signal S1 (3V). Since the voltage value of the first voltage signal S1 (3V) is larger than the voltage value of the first preset voltage signal PS1 (2V), the switch element 423 of the comparing unit 42 is turned on. Thus, the gate of the switching unit 43 is connected to the ground and at a low potential, and the switching unit 43 is turned on. The second voltage signal S2 is transmitted to the second terminal 22 via the switching unit 43 and then outputted to the power adaptor 3. Moreover, when the voltage value of the first voltage signal S1 is not larger than that of the first preset voltage signal PS1, which means the voltage level at the gate of the switch element 423 of the comparing unit is smaller than the threshold voltage value, the switch element 423 is turned off. At the moment, the voltage level at the gate of the switching unit 43 is the voltage level of the second voltage signal S2, and thus the switching unit 43 is turned off. In other words, the electronic device 4 does not output the second voltage signal S2.

Moreover, in the embodiment, the stabilizing unit 44 further includes a capacitor C and a resistor r. The capacitor C is connected to the voltage stabilizing resistor R in parallel. One end of the resistor r is coupled to the switching unit 43, and the other end is coupled to the capacitor C, the voltage stabilizing resistor R and the gate of the switch element 423 of the comparing unit 42. The resistance of the resistor r may be 1K Ω, and the capacitance of the capacitor C is 50 n F. The stabilizing unit 44 in the embodiment can avoid a malfunction due to a parasitic capacitance of the switching unit 43 when the power adaptor 3 is coupled to the electronic device 4.

Figure 5:
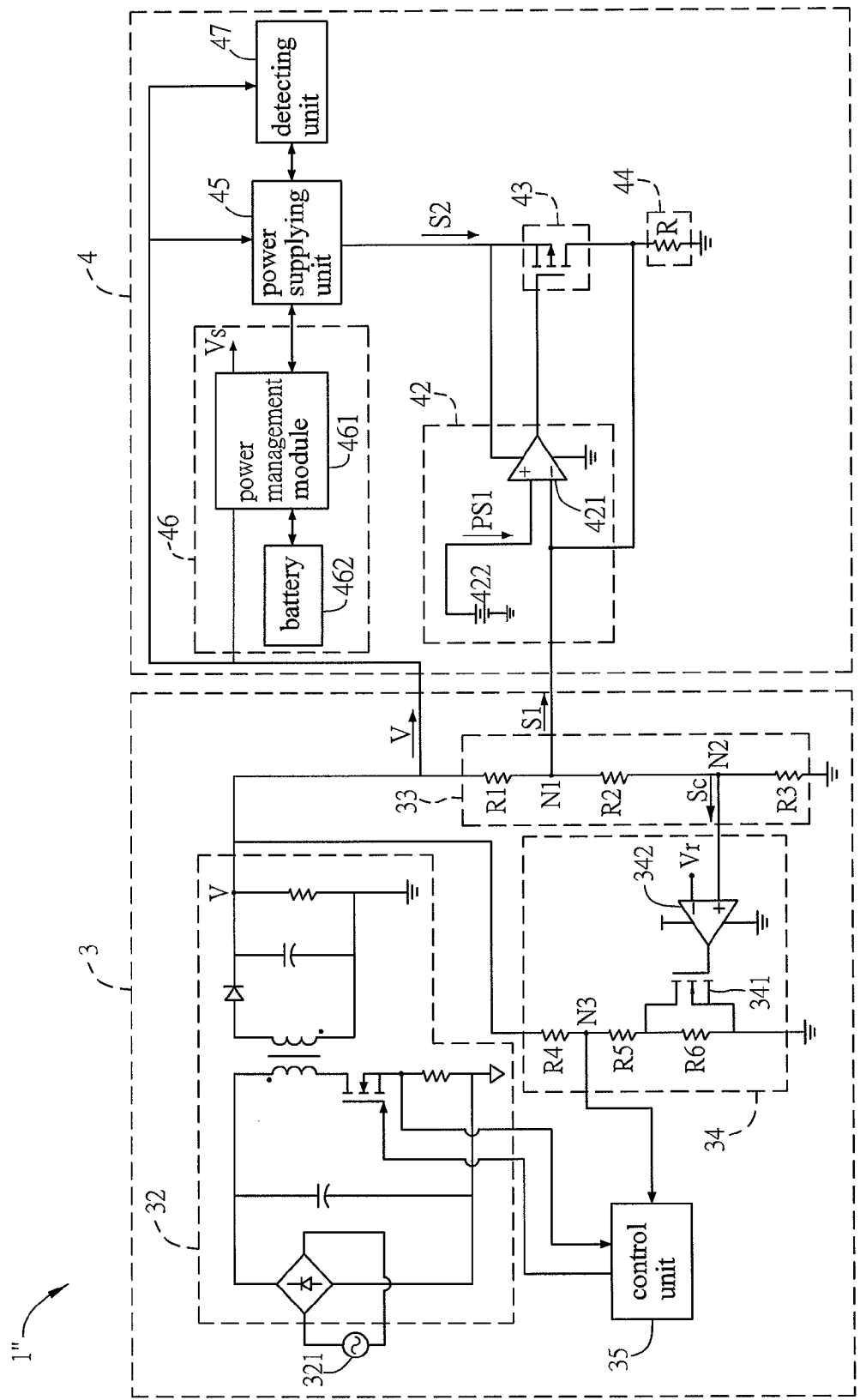
FIG. 5 is a schematic diagram showing a circuit of a charging system in an embodiment.

FIG. 5 is a schematic diagram showing a circuit of a charging system 1" in an embodiment. In the embodiment, the determining unit 34 of the charging system 1" includes a comparator 342. The non-inverting input node of the comparator 342 is coupled to the connecting point N2 to receive the second voltage signal S2, the inverting input node receives a reference voltage Vr, and the output node is coupled to the gate of the switch element 341 of the determining unit 34. The voltage value of the reference voltage Vr is 2.5V. When the power adaptor 3 is coupled to the electronic device 4, the voltage value of the control signal Sc (3V) is larger than the voltage value of the reference voltage Vr (2.5V). The comparator 342 of the determining unit 34 outputs a high potential, and the switch element 341 is turned on. Thus, the sixth resistor R6 is short circuit, and the voltage value transmitted from the connecting point N3 to the control unit 35 is changed. Then, the control unit 35 controls the power conversion unit 32 accordingly to adjust the voltage level of the charging voltage V from the first voltage level V1 to the second voltage level V2. The second voltage level V2 is 15V.

Figure 6:
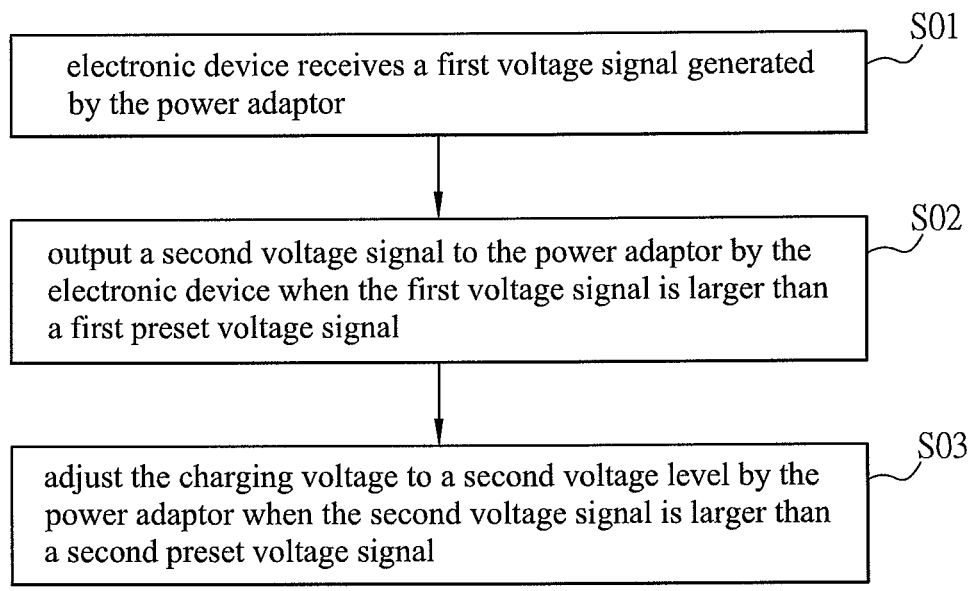
FIG. 6 is a flow chart showing a charging method in an embodiment.

FIG. 6 is a flow chart showing a charging method in an embodiment. Please refer to FIG. 6 and FIG. 1 to FIG. 5, the charging method is illustrated. The charging method is applied to the charging system 1 (which is also applied to the charging system 1' or the charging system 1"), and the charging system 1 includes a transmission line 2, a power adaptor 3 and an electronic device 4. In the embodiment, the transmission line 2 is coupled to the power adaptor 3 and the electronic device 4, respectively. The power adaptor 3 includes a charging voltage V, and the charging voltage V is at a first voltage level V1. The technology and the charging process of the charging system 1 are already illustrated in the previous embodiments, which are omitted herein.

As shown in FIG. 6, the charging method includes step S01, step S02 and step S03.

In the step S01, the electronic device 4 receives the first voltage signal S1 generated by the power adaptor 3. In the step S02, when the first voltage signal S1 is larger than the first preset voltage signal PS1, the electronic device 4 outputs the second voltage signal S2 to the power adaptor 3. Furthermore, in the step S03, when the second voltage signal S2 is larger than the second preset voltage signal PS2, the power adaptor 3 adjusts the voltage level of the charging voltage V to the second voltage level V2. The details of the charging method are already illustrated in the previous embodiment, which are omitted herein.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A charging system comprising:
   a transmission line including a first terminal and a second terminal;
   a power adaptor coupled to the first terminal and generating a charging voltage and a first voltage signal, wherein the charging voltage is at a first voltage level; and
   an electronic device includes:
   a comparing unit coupled to the second terminal and receiving the first voltage signal;
   a switching unit coupled to the comparing unit;
   a stabilizing unit coupled to the comparing unit and the switching unit; and
   a power supplying unit coupled to the switching unit and the comparing unit, and outputting the second voltage signal,
   wherein when the first voltage signal is larger than the first preset voltage signal, the second voltage signal is transmitted to the second terminal via the switching unit, and the second voltage signal is outputted to the power adaptor.

2. The charging system according claim 1, wherein the power adaptor includes:
   a power conversion unit coupled to the first terminal and generating the charging voltage;
   a voltage division unit coupled to the power conversion unit and generating the first voltage signal according to the charging voltage;
   a determining unit coupled to the voltage division unit; and a control unit coupled to the power conversion unit and the determining unit.

3. The charging system according claim 2, wherein the determining unit includes: a switch element coupled to the voltage division unit.

4. The charging system according to claim 2, wherein the determining unit includes:
a comparator coupled to the voltage division unit; and
a switch element coupled to the comparator.

5. The charging system according to claim 1, wherein the comparing unit includes:
a comparator coupled to the second terminal, the switching unit and the stabilizing unit, and receiving the first voltage signal; and
a preset voltage generating element coupled to the comparator, and outputting the first preset voltage signal.

6. The charging system according to claim 1, wherein the comparing unit includes:
a switch element coupled to the second terminal, the switching unit and the stabilizing unit, and receiving the first voltage signal; and
an impedance element coupled to the power supplying unit, the switching unit and the switch element.

7. The charging system according to claim 1, wherein the stabilizing unit includes:
a voltage stabilizing resistor coupled to the comparing unit and the switching unit.

8. The charging system according to claim 7, wherein the stabilizing unit further includes:
a capacitor connected to the voltage stabilizing resistor in parallel; and
a resistor coupled to the voltage stabilizing resistor and the capacitor.

9. The charging system according to claim 1, wherein the electronic device further includes:
a battery unit coupled to the power adaptor and receiving the charging voltage.

10. The charging system according to claim 9, wherein the battery unit includes:
a power management module coupled to the power adaptor and the power supplying unit, and receiving the charging voltage; and
a battery coupled to the power management module.

11. The charging system according to claim 1, wherein the electronic device further includes:
a detecting unit coupled to the power supplying unit,
wherein when the power adaptor is not coupled to the electronic device, the detecting unit turns off the power supplying unit.

* * * * *